3,690,896
PROCESS FOR FORMING A MULTI-COLORED FOOD PRODUCT
Donald L. Maxwell, Minneapolis, Minn., assignor to General Mills, Inc.
No Drawing. Filed May 15, 1970, Ser. No. 37,917
Int. Cl. A23l 1/18
U.S. Cl. 99—81　　　　　　　　　　　　　9 Claims

ABSTRACT OF THE DISCLOSURE

A process for making a multi-colored food product by introducing at least two different colored dyes into a continuous cooker on an alternate or sequential basis. A product is continuously discharged from the cooker which varies in color from each of the individual colors introduced, to a mixture of the two colors.

---

The present invention relates to a cereal product, and more specifically to a process for making a multi-colored cereal food product.

In the manufacture of cereal products, particularly those of the ready-to-eat variety such as breakfast foods and snacks, it is well known to produce such products in a variety of shapes, sizes, flavors, textures, and various combinations thereof. It has been found that ready-to-eat breakfast cereals especially, lend themselves to a great variety of unique features and characteristics because children, who comprise a large segment of the consumer market, are particularly intrigued and impressed with such features and characteristics. Thus, numerous approaches are continually being made to devise different and improved products, and new and different ways for making such products.

While several attempts have been made to produce a multi-colored cereal product wherein the colors of the individual pieces might vary with respect to each other over a relatively wide range of colors, none of the approaches have proven particularly satisfactory or economical. According to the known prior art, this has customarily been accomplished by forming a first quantity of pieces having a first color, forming a second quantity of pieces having a second color, and then combining and mixing the two quantities to form the final product. This method has severe shortcomings, especially when multiple colors are desired. Perhaps the biggest disadvantage and objection is that if more than one color is desired, a separate cooker is required for producing quantities of each color desired; after which, the separate quantities are then mixed together. A product mix of four colors for example, requires the use of four separate cookers. This requires substantial plant facilities and equipment, it results in storage problems, especially if the individual batches are separately stored, and it requires facilities for adequately mixing the separate batches so as to assure that a proper and desired blend is achieved for the final product. Understandably, it is uneconomical and difficult to obtain a product which is truly multi-colored, by using known prior art techniques.

Accordingly, one object of the present invention is to provide a new and improved process for making a multi-colored cereal product.

A further object is to provide a continuous process for making a multi-colored cereal product by using a minimum of two different dye colors.

Another object is to provide a procedure for obtaining a cereal product having a rainbow array of colors, by using only three primary colored dyes.

A still further object is to provide a process whereby a single continuous cooker can be used for making a multi-colored cereal product.

Other objects and advantages will become apparent from a consideration of the following detailed description of the invention.

Briefly, the invention concerns forming a food product, such as a ready-to-eat breakfast cereal, in a multiplicity of colors. This is accomplished by introducing different colored dyes into a continuous cooker in which the ingredients forming a cereal dough are being subjected to mixing and cooking conditions. At least two different dye colors, and preferably three different colors, are introduced into the cooker in an alternate or sequential manner. It has been found that only one color should be introduced at a time, and that the second color should preferably not be introduced while introduction of the first color is still being introduced; if a third color is included, its introduction should preferably begin after the second color is no longer being introduced into the cooker. By using an extruder-type cooker, an extrudate is formed which contains the colors introduced into the cooker, as well as a vast array of colors based on a combination of the two colors. The extrudate is then cut into pieces or pellets, dried to a desired moisture level, and subjected to puffing conditions so as to expand or puff the cereal pieces.

The present invention can be carried out by using a variety of cereal grains, such as rice, wheat, oats, corn, barley, or any combination of two or more of the grains, as the base material for forming cereal pieces having a variety of shapes and sizes. The above grains might initially be ground to a flour consistency, or if preferred, the size of the particles or granulation might be somewhat larger. When corn is used for example, it is preferably in the form of corn cones, i.e., the granular endosperm of corn which has been degerminated, rather than in the form of whole corn kernels or fine flour. It might be pointed out that in some instances, it might be desirable to use whole kernels, e.g. when rice is used. The exact nature of the cereal grain used, is relatively unimportant, because regardless of the type used, it is subjected to a cooking step whereby it is combined and mixed with water, and if preferred, other ingredients, to form a dough which is at least partially gelatinized. A dough having the desired characteristics can readily be made by varying the particular cooking conditions used.

Several other ingredients might be used to impart a particular flavor, texture, or appearance to the final product. As an example, wheat starch might be included in the formulation as a processing aid, binder, and filler; in addition, a small amount of sugar, and/or salt might be included, and various other additives might be provided for enrichment purposes, if desired. These other ingredients are optional, and their inclusion is in no way intended to limit the scope of the present invention.

The first step in the process after selecting the ingredients to be used, involves continuously introducing the ingredients into a cooker, and subjecting them to mixing and cooking conditions. The exact cooker to be used can vary; the primary factor to be considered is that it must be a continuous cooker, rather than a batch cooker. For purposes of illustration, it has been found that a continuous cooker similar to that disclosed in James Pat. No. 2,233,919 can be used with very satisfactory results. In such a cooker, the dough ingredients are mixed and kneaded while being cooked at a temperature of about 212° F., at substantially atmospheric pressure. After being subjected to such cooking conditions for a prescribed period of time, e.g. one hour, the dough, which is at least partially gelatinized, is forced or discharged from the cooking chamber through an extrusion orifice or die opening, in the form of an extrudate or rope. Other types of well known continuous cookers might also be used, wherein a higher shear action is developed and a shorter cooking time required (e.g. one minute or less) than generally prevalent in a cooker as described in the above patent. Moreover, continuous pressure cookers wherein the ingredients are pressure cooked, rather than being cooked at atmospheric pressure, might be used as well. The ingredients are introduced into the cooker at a predetermined feed rate, depending upon the size of the cooker, the nature of the ingredients used, the specific cooking conditions used, and the like.

The amount of water used as an initial ingredient may vary to some extent depending upon several factors, such as the moisture content of the cereal grain, as well as the type of grain used. Generally, the moisture content of the dough should range from about 25–40%, and more preferably about 30–35%. The dough discharged from the cooker may contain slighly less moisture than the dough within the cooker, because a certain amount of the moisture may flash off as it is discharged from the cooking chamber. The water is also introduced into the cooker at a prescribed feed rate, e.g. by pumping.

At least two different colorants, preferably in liquid form, are continuously introduced into the cooker in timed sequence, to provide the extrudate with its desired range of hues. Ordinarily, only one colorant is introduced at a time, although some overlapping might be used to achieve special color effects. Such a procedure results in a multicolored extrudate which varies between each of the two colors and a mixture of such colors. As an example, if a red dye is first continuously introduced into the cooking chamber along with the other ingredients, the ingredients are discharged in the form of a substantially red colored extrudate. When the red colorant is replaced by yellow, the mixing of the ingredients within the cooker, including the remaining portion of the red dye, causes the extrudate to continuously vary in color from red, through red orange, through orange, through orange-yellow, and finally to substantially all yellow. After a selected period of time, the red dye is again introduced into the cooker in lieu of the yellow dye, thus continuing the cycle.

If a wider range of colors is desired, this can readily be achieved by adding another color to the sequence of dyes introduced. By continuously introducing a blue dye after the yellow dye referred to above, an extrudate is obtained which ranges in color from yellow through green, through blue-green, and finally to substantially all blue. By subsequently replacing the blue dye with a red dye, and thus completing the cycle, a range of colors can be obtained which varies from blue through blue-violet, through violet, and finally to substantially all red. Thus, by using the three primary colors, red, yellow, and blue, a virtual rainbow array of colors can be obtained. If preferred of course, the specific sequence of color introduction might be changed.

At this point, it might be pointed out that since some cookers require a longer period of time to cook the ingredients than others, with the result that the ingredients are within the cooker for a relatively longer period of time, it is necessary to introduce a particular color into the cooker for a long enough time period to establish that color in the product. As the period of time which the ingredients are within the cooker is reduced, the colors can be switched at a faster rate.

The procedure thus consists of feeding a dye or blend of dyes, into a cooker which will produce a basic color, such as red, yellow, and blue, for a long enough period of time to establish that color in the extrudate, and then switching to the next basic color. The mixing effect in the cooker produces transient intermediate hues by mingling or mixing material containing the two primary colors together. Next, the third basic color is switched in, and finally, the original color is again switched in, thus completing the cycle. This procedure results in a whole spectrum of colors.

While the primary colors, red, yellow, and blue have been described above, it should be recognized that other dye colors might be used as well, to produce different ranges of colors in the product, although a "rainbow" of hues will not be obtained. It might also be pointed out that the balance of amounts of product of various shades in the final blend can be controlled by the relative lengths of the different portions of the color cycle. For example, it might be preferred to introduce the blue dye for a shorter period of time than the yellow or red dyes, because it dominates the other two colors.

The specific kind or type of edible coloring dye used is not overly critical, as it has been found that several colored dyes are commercially available and can be used. Preferably, the dye should be in liquid form, as this facilitates introducing it into the cooker and mixing it with the other ingredients. Such liquid dyes are readily formed by combining a prescribed amount of powdered dye with a prescribed amount of water to form a liquid dye having the desired hue. If preferred of course, the powdered dye might be introduced directly into the cooker. The liquid dye is pumped into the cooker, at a predetermined feed rate.

The dough is discharged from the cooker through a selected die opening so that it has a prescribed size and shape. As known, numerous dies are available for forming a variety of differently shaped products. The multicolored extrudate is preferably immediately cut into relatively thin wafers or pellets having a uniform thickness, at the face of the die opening. In certain instances however, it might be desirable to permit the extrudate or rope to temper for a certain amount of time before it is sliced.

It might also be pointed out that while it is preferred that the dough be extruded in the form of a rope, it might also be discharged in the form of a multi-colored sheet of material having a desired thickness. As known, the thickness of the sheet can readily be controlled quite precisely by controlling the size of the opening in the extrusion nozzle.

After being sliced, the pellets are dried so that the moisture level is reduced to about 8–14%, and preferably about 10–12%. It has been found that if the pellets are either too moist or too dry, they may not puff or expand to the desired extent, when subsequently subjected to intense heat. Various drying procedures and techniques might be employed. A suitable product can be obtained by drying at room temperature for a prescribed period of time; if time is important, however, the pellets can be dried at an elevated temperature, e.g., 100° F., by appropriate means.

After drying, the multi-colored pellets can be blended together for a prescribed period of time in an appropriate mixing device, and then puffed or expanded by subjecting them to intense heat. The extent of blending required depends to some extent, upon the length of time that the dough is being mixed and kneaded within the cooker. As the length of mixing time increases, it takes a longer period of time for a color change to occur in the extrudate; therefore, the color of the pellets will be predominantly one color for a given period of time. Thus, it is desirable to blend pellets which are formed during a given cycle with each other so that a random sample will contain a wide range of colors. As the mixing and cooking time decreases, the colors can be introduced into the cooker at a faster rate, and the amount of blending of the pellets can be reduced. It might be added that if preferred, a certain amount of blending of the pellets might also be achieved by using more than one cooker, wherein the color cycles are out of phase with each other.

The puffing can be accomplished by using radiant heat, salt puffing, deep fat frying, gun puffing, or the like. In making ready-to-eat breakfast cereals, gun puffing of the pellets has been found to work with excellent results. A continuous puffing gun similar to that disclosed in Tsuchiya et al. Pat. No. 3,231,387, has been found to be highly satisfactory for this purpose.

After puffing, the expanded product can be processed further, for example, by coating it with a sweetening composition, by mixing it with other ingredients, or the like. Such additional steps are well known in the art and will not be further discussed.

The invention will be better understood by reference to the following example:

Example I

A pre-mix was prepared by combining and mixing 1600 pounds of wheat starch with 400 pounds of sugar and 400 pounds of salt. A mixture comprised of about 54 parts of oat flour, 30 parts of corn cones, and 16 parts of the above pre-mix was continuously introduced into the inlet end of a jacketed cooker, similar to that described in the James Pat. No. 2,233,919, at a feed rate of about 10 pounds per minute. Water was pumped into the cooker at a rate of about 4.5 pounds per minute. The resulting dough had a moisture content of about 32%. A red liquid dye solution was formed by combining and mixing 2.03 parts by weight FD & C Red No. 2 coloring and 2.03 parts by weight FD & C Red No. 3 coloring with 95.94 parts by weight water. This solution was also pumped into the cooker at a feed rate of about 110 milliliters per minute, for a time period of about 2½ hours. Steam was introduced into the jacketed cooker at a pressure of about 10 p.s.i.g. and a temperature of about 238° F. The dough was cooked at approximately atmospheric pressure for about one hour, during which time the ingredients were thoroughly mixed and the cereal ingredients were at least partially gelatinized. The dough was discharged through the die opening to form an extrudate which was substantially red in color, and which had a moisture content of approximately 27–28%. The extrudate was immediately sliced into pellets or wafers about 0.040 inch thick, at the face of the die opening.

After the red dye had been introduced into the cooker for about 2½ hours, a switch was made to a yellow colored dye solution, formed by combining and mixing 2.48 parts by weight FD & C Yellow No. 5 coloring with 97.52 parts by weight water; this solution was likewise pumped into the cooker at the same feed rate, i.e., 110 milliliters per minute. The yellow dye combined with the red dye within the cooker to form an extrudate which was predominantly red in color, but which gradually changed to red-orange as more of the yellow dye was pumped into the cooker and mixed with the ingredients therein. The color of the extrudate ultimately changed to orange, and then to yellow-orange, and finally to substantially all yellow.

The yellow dye was pumped into the cooker for about 3 hours, after which a switch was made to a blue colored dye which was formed by mixing 0.69 part by weight FD & C Blue No. 1 and 1.72 parts by weight FD & C Violet No. 1 with 97.59 parts by weight water. This solution was pumped into the cooker for a period of two hours. As the blue dye gradually mixed with the yellow colored ingredients within the cooker, the color of the extrudate gradually changed from predominantly yellow, to yellow-green, to green, to blue-green, and finally to substantially completely blue.

After about two hours, the color was again switched to the red dye. This completed the cycle and produced an extrudate which changed in color from blue, to blue-violet, to violet, and finally to red.

The multi-colored pellets were dried in a rotary drier to a moisture content of about 11% after which they were blended together for a short period of time to form a multi-colored blend of pellets. The pellets were then introduced into a conventional puffing gun to form a puffed, rainbow-hued breakfast cereal.

The above description describes a procedure for making a multi-colored cereal product by using a single cooker. While the coloring technique has been described in conjunction with food ingredients which are mixed, cooked, and discharged on a continuous basis, it should be realized that the coloring technique might be used for ingredients other than food, which are formed into an extrudate on a continuous basis. It is envisioned that the technique might be effectively used in the plastics art for example, wherein materials such as thermoplastic resins, plasticizers, foaming agents, anti-oxidants, and the like, are admixed and discharged through an extruder in which the resin is melted and the other components uniformly dispersed throughout the melted resin, to form an extrudate in the form of a thermoplastic blown film, thermoplastic pellets, or the like. It is contemplated that the herein described technology might be used for making a multi-colored plastic extrulate as well, wherein a minimum of at least two dyes are sequentially and alternately introduced into the extrusion chamber.

In the above description, a disclosure of the principles of this invention is presented, together with an example by which the invention might be carried out.

Now, therefore, I claim:

1. A process for making a multi-colored cereal product which comprises continuously introducing ingredients to be cooked and formed into a dough into a continuous cooker, introducing a first colorant into said cooker on a continuous basis for a first period of time sufficiently long to establish that color in the product, mixing and cooking said ingredients within the cooker thereby forming a dough which is at least partially gelatinized, introducing a second colorant into said cooker on a continuous basis during the cooking process for a second period of time sufficiently long to establish that color in the product, and continuously discharging said cooked dough from the cooker, the color of a portion of said discharged product being based on said first colorant, the color of a portion of said product being based on said second colorant, and the color of a portion of said product being based on a mixture of said first and second colorants.

2. The process of claim 1 wherein three different colorants are continuously and alternately introduced into the cooker, thereby forming a cooked dough which when discharged from the cooker varies in color from three basic colors to a combination of two of said basic colors.

3. The process of claim 2 wherein only one colorant is introduced into the cooker at a time.

4. The process of claim 2 wherein the three colors are red, yellow, and blue, introduction of said yellow colorant following introduction of said red colorant, introduction of said blue colorant following introduction of said yellow colorant, and introduction of said red colorant following introduction of said blue colorant.

5. The process of claim 4 which includes introducing the red and yellow colorants into the cooker for a longer period of time than the blue colorant.

6. The process of claim 1 which includes discharging the gelatinized dough from the cooker in the form of an extrudate, shaping said extrudate into pieces having a prescribed shape and size, drying said pieces to a predetermined moisture level, and subjecting said dried pieces to intense heat thereby causing said pieces to puff and expand.

7. The process of claim 6 wherein the moisture content of the dough within said cooker ranges from about 25–40%, and the pieces are dried to a moisture content of about 8–14%.

8. The process of claim 6 which includes introducing the ingredients into an extruder wherein said ingredients are continuously mixed, continuously cooked at an elevated temperature, and continuously discharged in the form of a rope of material having a prescribed size and shape, and slicing said extruded rope into pieces have a prescribed thickness.

9. The process of claim 8 which includes blending the pellets together after they have been dried, and expanding the dried pieces by pressure puffing.

References Cited

UNITED STATES PATENTS

| 3,464,828 | 9/1969 | Cummisford | 99—82 |
| 3,482,992 | 12/1969 | Benson | 99—81 |
| 3,499,766 | 3/1970 | Vollink et al. | 99—81 |

OTHER REFERENCES

Matz: "The Chemistry and Technology of Cereals as Food and Feed." Avi Publishing Co., Westpoint, Conn., pp. 562–64.

RAYMOND N. JONES, Primary Examiner

U.S. Cl. X.R.

99—82, 83